United States Patent
Gugel et al.

(10) Patent No.: US 6,891,670 B2
(45) Date of Patent: May 10, 2005

(54) DOUBLE CONFOCAL SCANNING MICROSCOPE

(75) Inventors: Hilmar Gugel, Dossenheim (DE); Joerg Bewersdorf, Heidelberg (DE); Stefan W. Hell, Goettingen (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 09/683,713

(22) Filed: Feb. 6, 2002

(65) Prior Publication Data

US 2002/0109913 A1 Aug. 15, 2002

(51) Int. Cl.[7] .......................... G02B 21/06; G02B 21/00
(52) U.S. Cl. ................. 359/387; 359/368; 359/385
(58) Field of Search ................... 359/368–390

(56) References Cited

U.S. PATENT DOCUMENTS

| 5,386,112 A | * | 1/1995 | Dixon ....................... 250/234 |
| 5,521,705 A | * | 5/1996 | Oldenbourg et al. ........ 356/368 |
| 5,587,832 A | * | 12/1996 | Krause ....................... 359/368 |
| 5,671,085 A | * | 9/1997 | Gistafsson et al. ......... 359/385 |
| 5,760,951 A | * | 6/1998 | Dixon et al. ............... 359/385 |
| 6,025,956 A | * | 2/2000 | Nagano et al. ............. 359/386 |

FOREIGN PATENT DOCUMENTS

| DE | 39 18 412 A1 | * | 2/1990 | .................. 359/386 |
| DE | 199 14 049 A1 | * | 10/2000 | .................. 359/386 |
| EP | 0 491 289 A1 | | 6/1992 | |

* cited by examiner

Primary Examiner—Thong Q Nguyen
(74) Attorney, Agent, or Firm—Houston Eliseeva LLP

(57) ABSTRACT

The present invention concerns a double confocal scanning microscope having an illuminating beam path (1) of a light source (2) and a detection beam path (3) of a detector (4), and in order to eliminate at their cause the problems of reconstruction methods. To do so, at least one optical component (24, 25) acting on the illuminating and/or detection beam path (1, 3) is provided, and is configured in such a way that it influences the amplitude and/or phase and/or polarization of the light; and the characteristics of the double confocal illumination and/or detection are thereby modifiable.

13 Claims, 5 Drawing Sheets

US 6,891,670 B2

DOUBLE CONFOCAL SCANNING MICROSCOPE

CROSS REFERENCE TO RELATED APPLICATIONS

Referenced-applications

This application claims priority of the German patent application 101 07 095.0, filed on Feb. 14, 2001, which is incorporated by reference herein.

BACKGROUND OF INVENTION

The present invention concerns a double confocal scanning microscope having an illuminating beam path of a light source and a detection beam path of a detector.

EP 0 491 289 A1 discloses a double confocal scanning microscope in which the light of a light source is divided into two partial beams, and each partial beam is focused with the aid of a respective microscope objective onto a common specimen point. The two microscope objectives are arranged on different sides of the specimen plane that is common to them. At the specimen point, this interferometric illumination causes formation of an interference pattern that, in the case of constructive interference, exhibits a principal maximum and several secondary maxima. The illumination pattern in the specimen region and in the common microscope objective focus is also referred to as a double confocal illumination point spread function (illumination PSF). If only double confocal illumination is implemented, the term "type A double confocal scanning microscope" is applied. Detected light then emerges from the specimen illuminated by the illumination PSF; the detected light can be, for example, fluorescent, reflected, or transmitted light. If the optical path length difference between the two beam path segments is less than the coherence length of the detected light, the detected light can in turn interfere at the detection pinhole. The interfering or non-interfering detected light imaged by the microscope objectives forms an illumination pattern that is also referred to as the detection point spread function (detection PSF). If only double confocal detection needs to be implemented, for example because the specimen is illuminated with the light from only one partial beam, the term "type B double confocal scanning microscope" is applied. In situations in which both double confocal illumination and double confocal detection are implemented, the term "type C double confocal scanning microscope" is applied.

A double confocal illumination PSF and/or detection PSF exhibits secondary maxima that generally are arranged along the optical axis. As a result of the interferometric illumination or detection, increased axial resolution as compared to conventional (scanning) microscopy can be achieved with a double confocal scanning microscope.

The image of a specimen acquired with a double confocal scanning microscope principally exhibits a contribution that results from the principal maximum of the illumination PSF and/or detection PSF. Additionally superimposed on the image, however, are components that result from the secondary maxima of the illumination PSF and/or detection PSF. Since these image components are disruptive, they are generally removed from the acquired image later using reconstruction methods. Inverse filtration methods, which are implemented in the form of program modules on a computer, are primarily used in this context. The reconstruction methods can only be successfully applied, however, if the intensity of the secondary maxima is much less than 50% of the intensity of the principal maximum of the illumination PSF or detection PSF. If this condition is not met, either the noise component of the reconstructed image is too high, or the contributions of the secondary maxima cannot be completely removed from the image, so that "ghosts" of the imaged specimen structure remain in the image. Unequivocal specimen analysis and image interpretation can thereby be rendered difficult or even impossible.

It is therefore an object of the present invention to eliminate the problems of the reconstruction methods at their cause.

SUMMARY OF INVENTION

It is therefore an object of the present invention to eliminate the problems of the reconstruction methods at their cause.

The above object is achieved by a double confocal scanning microscope comprising:

a light source defining an illuminating beam path;

a detector defining a detection beam path; and at least one optical component acting on the illuminating and/or detection beam path, wherein the optical component is configured that it influences the amplitude, phase or polarization of the light; and the characteristics the light in the illuminating beam path or the detection beam path of the double confocal scanning microscope are thereby modifiable.

What is advantageous according to the present invention is firstly that a modification of the characteristics of the double confocal illumination, the detected contributions that result from the secondary maxima can be greatly reduced if not indeed eliminated. A modification of the detection characteristics or of the illumination and detection characteristics can also result in a diminution of the detected contributions from the secondary maxima. As a result of a diminution in the secondary maxima, the reconstruction methods can be successfully applied and ideally can even be dispensed with.

Therefore, at least one optical component is arranged in the beam path of the double confocal scanning microscope; the optical component can be provided in either the illuminating beam path or the detection beam path, or in the illuminating and detection beam paths. If an optical component is arranged only in the illuminating beam path, only the characteristics of the double confocal illumination are thereby modified. Arranging the optical component only in the detection beam path correspondingly modifies the characteristics of the double confocal detection. Arranging the optical component in the illuminating and detection beam paths affects the characteristics of the double confocal illumination and detection. The optical component is configured in such a way that it influences the amplitude and/or phase and/or polarization of the light, specifically of the light that interacts with the optical component. The interaction is understood to be, for example, a transmission, a reflection, or a combination of transmission and reflection (for example in the case of an optical component of partially reflective configuration).

BRIEF DESCRIPTION OF DRAWINGS

There are various ways of advantageously embodying and developing the teaching of the present invention. The reader is referred to the specification and with reference to the accompanying drawings. In the drawings.

DETAILED DESCRIPTION

Figure 1:
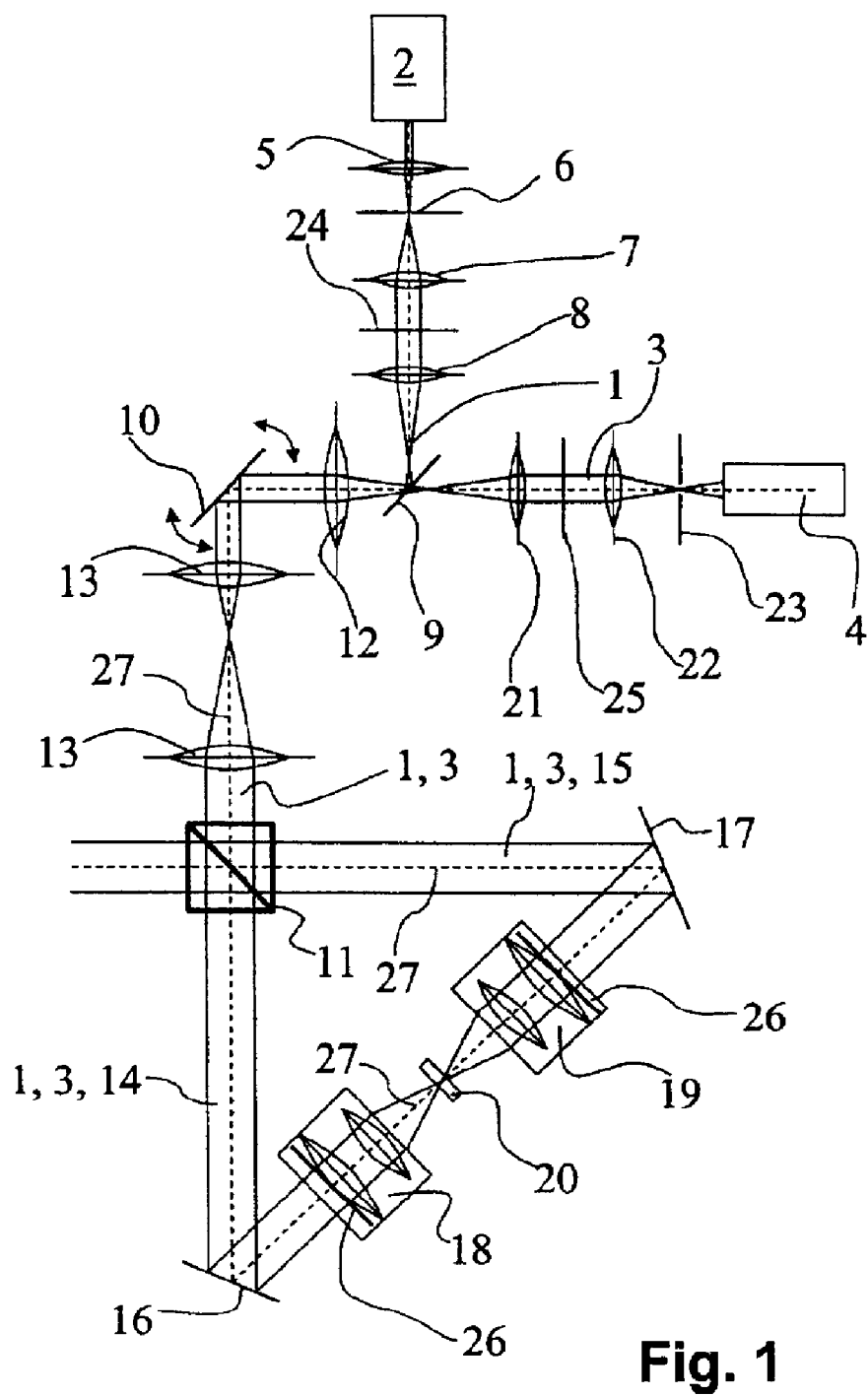
FIG. 1 is a schematic depiction of a first exemplary embodiment of the present invention.

FIG. 1 shows a double confocal scanning microscope having an illuminating beam path 1 of a light source 2 and a detection beam path 3 of a detector 4.

Light of light source 2 is focused by means of lens 5 onto illumination pinhole 6. A first intermediate image of illumination pinhole 6 is formed by way of lenses 7, 8. The light of illuminating beam path 1 is then reflected by dichroic beam splitter 9 toward beam deflection device 10. A lens 12 that collimates the beam is provided between dichroic beam splitter 9 and beam deflection device 10. Beam deflection device 10 comprises a mirror that reflects the illuminating light. The mirror of beam deflection device 10 is mounted pivotably about two axes, so that the illuminating light can be deflected or scanned by appropriate pivoting of the mirror. Two lenses 13, 13 are arranged between beam deflection device 10 and beam splitter 11. Beam splitter 11 divides illuminating beam path 1 into two beam path segments 14, 15. The light passing along said beam path segments 14, 15 is reflected at mirrors 16, 17 respectively. The two microscope objectives 18, 19 are arranged in beam path segments 14, 15 respectively. Both microscope objectives 18, 19 focus the illuminating light of illuminating beam path 1 onto specimen 20 arranged in the common specimen plane. Specimen 20, indicated schematically, is a biological specimen that has been specifically labeled with fluorescent dyes. The illuminating light of suitable wavelength excites the fluorescent dyes to fluoresce. The fluorescent light emitted from specimen 20, which is collected by microscope objectives 18, 19, passes along the illuminating beam path in the opposite direction until it arrives at dichroic beam splitter 9. As a result of the Stokes shift of the fluorescent light, it can pass through dichroic beam splitter 9, so that the detected light is focused by the two lenses 21, 22 onto detection pinhole 23. The light from the focal plane of the two microscope objectives 18, 19 can pass through detection pinhole 23, and is ultimately detected by detector 4.

The illuminating beam path thus extends from light source 2 via dichroic beam splitter 9 to beam deflection device 10 and beam splitter 11. Also part of the illuminating beam path are the two beam path segments 14, 15 that extend to the specimen. The detection beam path extends from specimen 20 to beam splitter 11, i.e. it contains the two beam path segments 14, 15. The usable portion of detection beam path 3 then extends to beam deflection device 10 and on to detector 4.

According to the present invention, an optical component 24 that acts on illuminating beam path 1, and is configured in such a way that it influences the amplitude and phase of the light of illuminating beam path 1, is provided. Additionally provided according to the present invention is an optical component 25, arranged in detection beam path 3, that also influences the amplitude and phase of the detected light.

Figure 2:
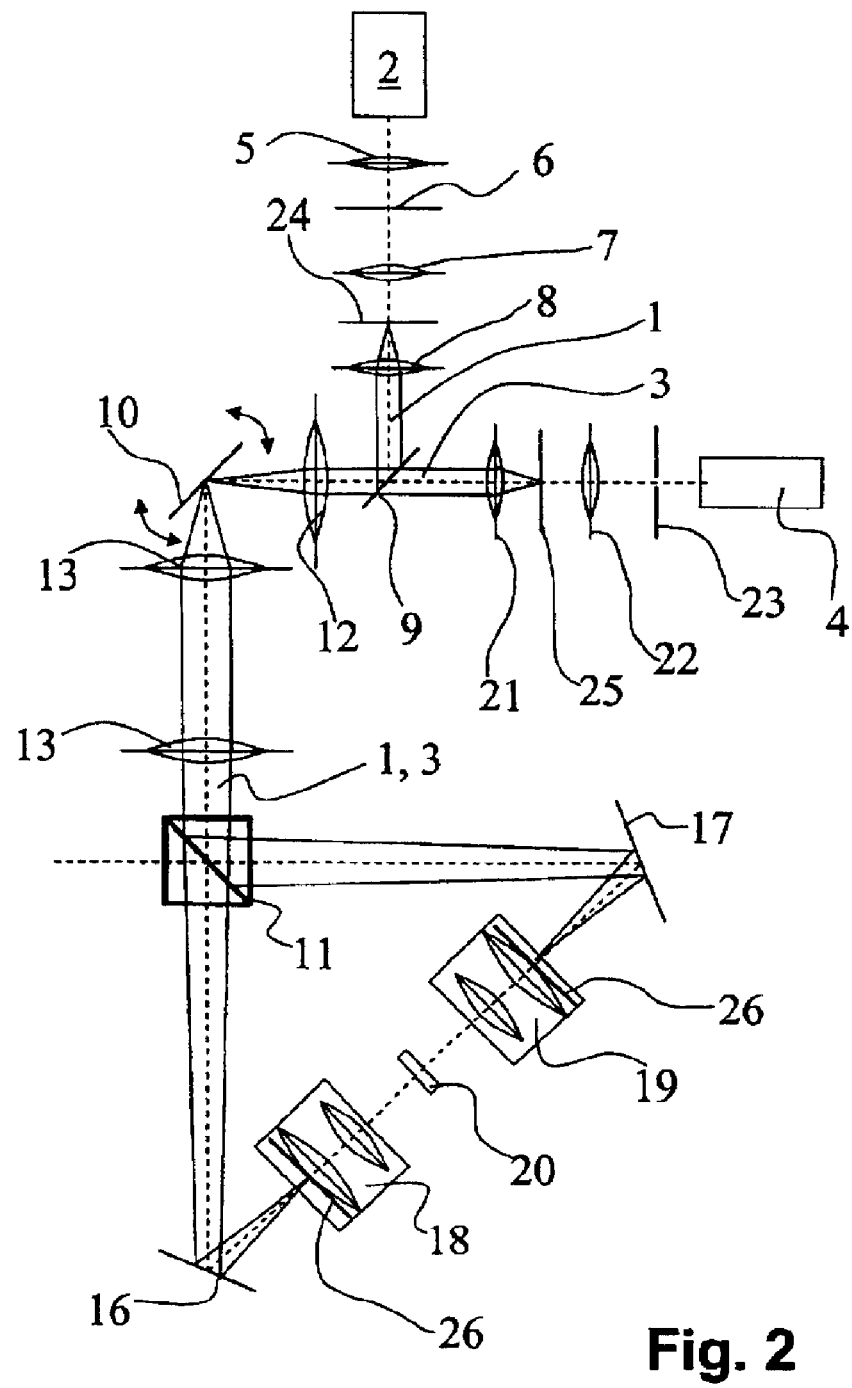
FIG. 2 is a schematic depiction of the exemplary embodiment from FIG. 1, the beam path of the filter image here being shown.

FIG. 2 shows the double confocal scanning microscope of FIG. 1; here the solid lines indicating the optical beam path show the beam path of the image of optical components 24 and 25 as far as microscope objective pupils 26.

Figure 3:
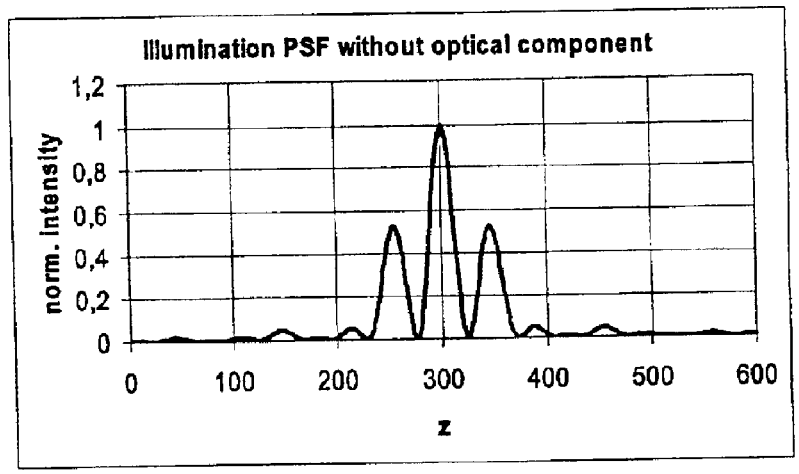
FIG. 3 is a diagram of the illumination PSF of a double confocal scanning microscope.

FIG. 3 shows, in a diagram, the normalized intensity of the illumination PSF of the double confocal scanning microscope of FIG. 1, but without the use of the two optical components 24, 25. The diagram shows the normalized intensity of the illuminating light as a function of the local coordinate along optical axis 27 (drawn with dashed lines in FIG. 1) in the focus region of the two microscope objectives 18, 19. The principal maximum of the illumination PSF, which has a normalized intensity value of 1, is visible at the Z coordinate 300. The first two secondary maxima, which have normalized intensity values of approximately 0.5, are visible to the left and right of the principal maximum. The shape of the double confocal illumination PSF and/or detection PSF can be modified by the optical component 24 or 25. Provision is made in this context, in particular, for the shape of the axially arranged secondary maxima of the double confocal illumination PSF and/or detection PSF to be modified in controlled fashion; modification of the principal maximum is also conceivable. In the event that operation of the double confocal scanning microscope is directed toward the presence of destructive interference, the optical component 24 or 25 could also modify the shape of the two principal maxima resulting from the destructive interference. In particularly preferred fashion, the optical component is configured in such a way that by means of its utilization, the intensity of the secondary maxima of the illumination PSF and/or detection PSF can be diminished. As a result, in particularly advantageous fashion, the detected contributions brought about by the secondary maxima of the illumination PSF and/or detection PSF can be similarly diminished.

Figure 4:
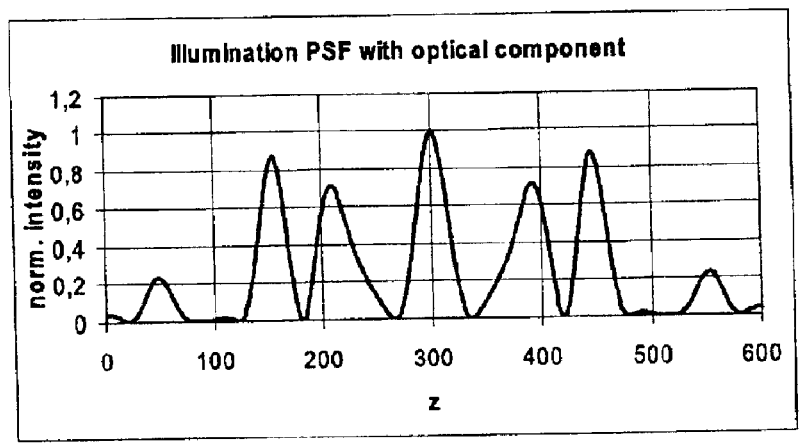
FIG. 4 is a diagram of the illumination PSF of a double confocal scanning microscope with an optical component according to the present invention in use.

FIG. 4 shows, by contrast with FIG. 3, the illumination PSF of the double confocal scanning microscope when optical component 24 is arranged, in accordance with the present invention, in the illuminating beam path. Here again, the normalized intensity of the illuminating light is shown as a function of the local coordinate along optical axis 27 (Z direction). According to the present invention, optical component 24 is configured in such a way that it influences the amplitude and phase of the illuminating light, thereby modifying the characteristics of the double confocal illumination. It is thus evident from FIG. 4 that the shape of the double confocal illumination PSF is modified, as compared to the shape of the illumination PSF of FIG. 3, by optical component 24. It may furthermore be gathered from FIG. 4 that a principal maximum with a normalized intensity value of 1 is present at the Z coordinate 300. This principal maximum exhibits a slightly broadened FWHM (full width at half maximum) compared to the principal maximum of FIG. 3. Also evident alongside the principal maximum of FIG. 4 are several secondary maxima, in particular the two secondary maxima adjacent to the principal maximum at Z coordinates of approximately 210 and 390. These two secondary maxima are modified in shape compared to the two secondary maxima of FIG. 3. Their position is also different as compared to the illumination PSF of FIG. 3. Two further respective secondary maxima are moreover also evident, two secondary maxima with a normalized intensity value of approx. 0.9 being arranged at Z coordinates of approximately 150 and 450, respectively. The two secondary maxima with a normalized intensity value of approximately 0.25 are arranged at the Z coordinates 50 and 550.

Comparing the illumination PSF of FIG. 4 to that of FIG. 3, it is apparent that the distance between the principal maximum and secondary maxima is increased in FIG. 4. This increase alone in the distances between the principal maximum and the two first secondary maxima would result, in and of itself, in a FWHM for the principal maximum of approx. 100 nm, since all the secondary maxima shown in FIG. 4 are reduced because of detection pinhole 23. The axial resolution capability of a double confocal scanning microscope of this kind is accordingly approximately 100 nm. Computer-aided deconvolution operations or inverse filtrations of the detected image data are considerably simplified by the low secondary maxima.

Figure 5:
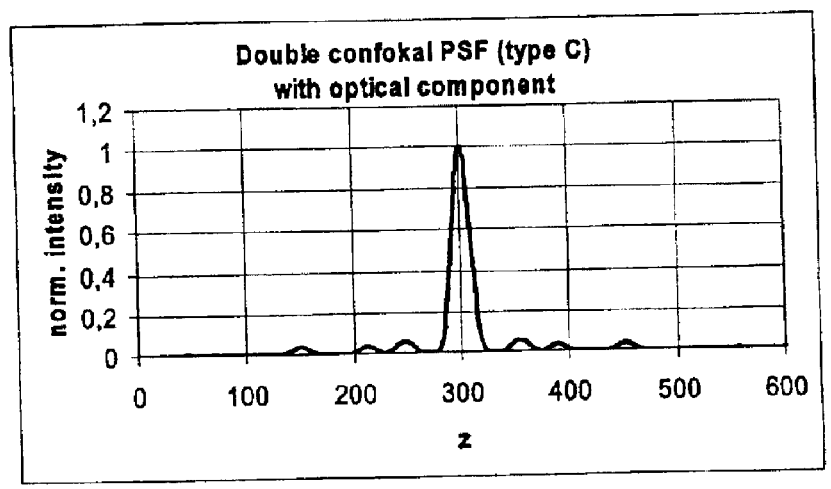
FIG. 5 is a diagram of the overall PSF of a type C double confocal scanning microscope.

FIG. 5 shows an overall PSF of a type C double confocal scanning microscope. Here only optical component 24 in illuminating beam path 1 was used; a further optical component is not provided for this purpose. The overall PSF shown in FIG. 5 is thus based on the one hand on the illumination PSF of FIG. 4 and on the other hand on a PSF comparable to that of FIG. 3, i.e. a detection PSF. The product of the illumination PSF and detection PSF yields the overall PSF shown in FIG. 5; in the diagram, once again the normalized intensity of the overall PSF is plotted as a function of the Z coordinate along optical axis 27. It is particularly clearly evident here that now only one principal maximum again at the Z coordinate 300 with a normalized intensity value of 1 is present. As compared to the PSFs of FIGS. 3 and 4, the secondary maxima of FIG. 5 play a subordinate or negligible role. This is attributable in particular to the fact that the secondary maxima of the illumination PSF of FIG. 4 and the secondary maxima underlying the comparable detection PSF of FIG. 3 are located at different axial positions. When the product of the illumination PSF and the detection PSF is derived, the principal maximum is accordingly amplified to a much greater extent than is the case for the secondary maxima.

In the exemplary embodiment of FIGS. 1 and 2, two optical components 24 and 25 are provided, optical component 24 of illuminating beam path 1 being different from optical component 25 of detection beam path 3.

It is evident particularly clearly from FIG. 2 that the two optical components 24, 25 are arranged in a plane optically conjugated with microscope objective pupil 26.

Figure 6:
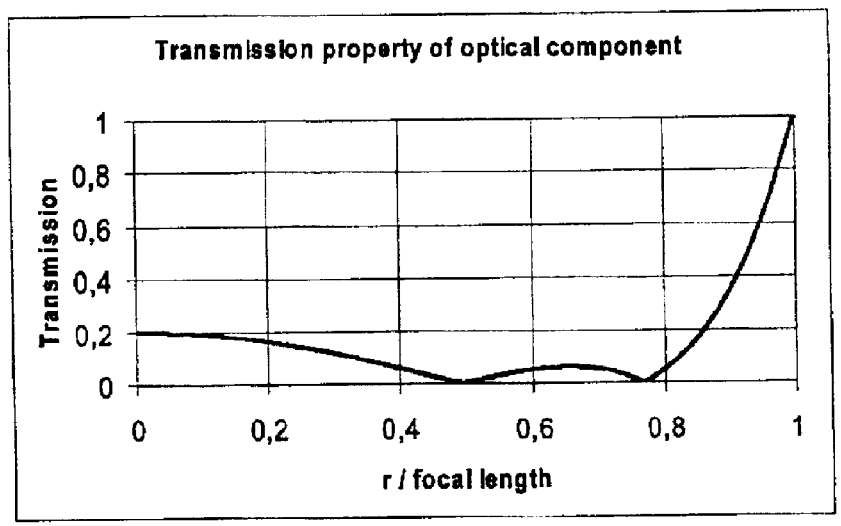
FIG. 6 is a diagram of the transmission property of an optical component.
Figure 7:
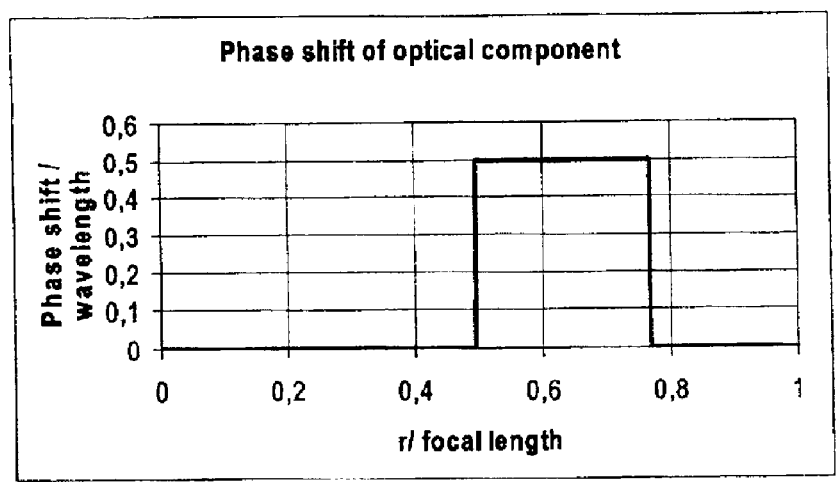
FIG. 7 is a diagram of the phase shift of the optical component.

FIGS. 6 and 7 show the optical properties of optical component 24. Optical component 24 is a filter that influences both the phase and the amplitude of the illuminating light. In the diagram of FIG. 6, the transmission property of optical component 24 (which is of rotationally symmetrical configuration) is depicted as a function of its radius r divided by the focal length of the microscope objective. It is thus apparent from the diagram that the transmission at a radial value of 0 (i.e. at the location of optical axis 27) has a value of 0.2. It is further evident that a transmission of 0 occurs at two different locations, namely between 0.4 and 0.8. Lastly, when the distance from the optical axis divided by the focal length of the microscope objective is equal to 1, optical component 24 has a transmission value of 1.

In the diagram of FIG. 7, the phase shift of the rotationally symmetrical component 24 over the wavelength is plotted, again as a function of the radius r divided by the focal length of the microscope objective. It is apparent that the phase shift over wavelength has a value of 0.5 at the locations between the two minima of the diagram of FIG. 6. At all other points of optical component 24, no phase shift occurs.

In very particularly preferred fashion, provision is made for the secondary maxima of the illumination PSF and the detection PSF to be located, as a result of the optical component 24 and 25, at different positions. Because, in double confocal scanning microscopy as in confocal scanning microscopy, the overall PSF is defined by the product of the illumination PSF and the detection PSF, the intensity of the secondary maxima of the overall PSF can be reduced or minimized by the fact that the principal maxima of the illumination PSF and detection PSF are located in the same position, but the secondary maxima of the illumination PSF and detection PSF are located at different positions. Creation of the product thus causes only the principal maximum, but not the secondary maxima, to exhibit a high intensity value. Since the secondary maxima are arranged, in double confocal scanning microscopy, in particular along the optical axis (i.e. in the axial direction), the secondary maxima of the illumination PSF and detection PSF can be diminished in intensity if, in particular, the secondary maxima are located at different axial positions.

In a particularly preferred embodiment, several optical components 24 and 25 (see FIG. 1 and 2) are provided for influencing the amplitude and/or phase and/or polarization of the light. For example, the optical component 24 and 25 arranged in the one beam path segment 14 of the double confocal scanning microscope could be different from that in the other beam path segment 15. Furthermore, an optical component different from that in the illuminating beam path 1 could be provided in the detection beam path 3. Lastly, in such cases the optical components are to be configured in such a way that the characteristics of the double confocal illumination and/or detection are optimized in terms of signal yield and minimization of image artifacts.

In order to modify the characteristics of the double confocal illumination and/or detection, provision is made for the optical component to modulate the wave front of the illuminating light and/or the detected light. This can be a temporal and/or spatial modulation, although a spatial modulation is preferred. It would be conceivable, for example, when two optical components are used, for the spatial modulation of the light brought about by the components to be variable over time. In particular, provision could then be made for a specimen to be imaged twice with the double confocal scanning microscope according to the present invention, the modulation of the two optical components being configured exactly oppositely in each case for the second specimen detection, so that an optimum specimen data set can be extracted computationally from the two detected specimen data sets.

In particularly preferred fashion, the optical component 24,25 is arranged in a microscope objective pupil. Because of the poor accessibility of the pupil plane of a microscope objective, which generally is located in the objective itself, a plane optically conjugated with the pupil plane is preferably selected as the filter location. With such an arrangement, the design and configuration of the optical components can more easily be calculated. The reason for this is that if the optical components influencing the light are arranged in the microscope objective pupil or in a plane optically conjugated therewith, it is possible to utilize the methods of Fourier optics. Of course it is also possible to arrange the optical component at any desired location in the illuminating and/or detection beam path, but in such a case a possibly more complex calculation of the optical component is necessary.

Concretely, an amplitude filter and/or phase filter could be provided as the optical component 24, 25. Said filter correspondingly influences the amplitude and/or phase of the light. Provision is made for the filter to exhibit different amplitude or phase properties perpendicular to the optical axis. Retardation plates and/or phase plates can furthermore serve as optical components.

An LCD (liquid crystal device) arrangement could be provided as the optical component. The use of LCD arrangements makes possible, in particularly advantageous fashion, a flexible and variable configuration of the optical component. If a color LCD arrangement is used, light of individual wavelengths or individual wavelength regions can, in particularly advantageous fashion, be selectively influenced.

Partially amplitude-modifying elements can furthermore serve as optical components. This can be, in particular, a neutral density filter that exhibits locally different filter properties.

It is conceivable in very general terms for other elements that modify the wave front of the illuminating or detected light to be provided as the optical component. For example, it may be mentioned at this juncture that an adaptive optical system could be provided as the optical component. This could be, concretely, a deformable mirror. The deformable mirror could, for example, be configured in such a way that piezoelements which can individually be differently activated are arranged between a deformable mirror layer and a baseplate. The mirror surface can thus be deformed as a function of the activation of the individual piezoelements.

Provision is also made for the optical component to have different effects on light of differing polarization and/or wavelengths. For example, the optical component could have—in addition to its properties modifying the amplitude, phase, and/or polarization—an at least locally reflective effect on light of a specific polarization direction. The optical component could, again at least locally, influence the polarization of the light in such a way that light of one polarization state is converted to another. This could involve a simple rotation of the polarization direction of the light; a conversion from a circular to an elliptical or linear polarization, and vice versa, is also conceivable. The optical component could, however, also be embodied as a dichroic filter, so that its filter effect acts only on light of a specific wavelength region.

What is claimed is:

1. A double confocal scanning microscope comprising:
   a light source defining an illuminating beam path with an inherent unmodified illumination point spread function (PSF), the illuminating beam path having a length;
   a detector defining a detection beam path with an inherent unmodified detection point spread function (PSF), and
   two spaced apart microscope objectives for focusing light propagating along the illumination beam path onto a specimen which is disposed in a common specimen plane defined by the two microscope objectives, the length of the illuminating beam path being the same for both microscope objectives; and
   at least one optical component disposed in the illuminating or detection beam path, wherein the optical component is configured to vary the amplitude, phase or polarization of the light and thereby to modify a shape of the unmodified illumination PSF of the light in the illuminating beam path to produce a modified illumination PSF or of the unmodified detection PSF in the detection beam path to produce a modified detection PSF, wherein secondary maxima of modified and unmodified PSFs are located at different axial positions causing reduction of intensity of secondary maxima of an overall PSF produced by the modified illumination PSF and/or modified detection PSF.

2. The double confocal scanning microscope as defined in claim 1, wherein the unmodified illumination PSF in the illumination beam path and the unmodified detection PSF in the detection beam path shows axially arranged secondary maxima both of which are modifiable as to their shape or position.

3. The double confocal scanning microscope as defined in claim 1, wherein the optical component is used to increase the distance between a principal maximum of the modified illumination PSF in the illumination beam path or a principal maximum of the modified detection PSF in the detection beam and secondary maxima.

4. The double confocal scanning microscope as defined in claim 1, wherein the optical component is used to locate the secondary maxima of the modified illumination PSF in the illuminating beam path or the modified detection PSF in the detection beam path at different axial positions.

5. The double confocal scanning microscope as defined in claim 1, wherein the optical component modulates the wave front of the illuminating light or detection light.

6. The double confocal scanning microscope as defined in claim 1, wherein the optical component is disposed in a pupil of at least one microscope objective or in a plane optically conjugated therewith.

7. The double confocal scanning microscope as defined in claim 1, wherein the optical component is disposed at any desired location in the illuminating beam path or the detection beam path.

8. The double confocal scanning microscope as defined in claim 1, wherein the optical component is an amplitude filter and a phase filter.

9. The double confocal scanning microscope as defined in claim 1, wherein the optical component is a retardation plate or phase plate.

10. The double confocal scanning microscope as defined in claim 1, wherein the optical component is an LCD (liquid crystal device) arrangement.

11. The double confocal scanning microscope as defined in claim 1, wherein the optical component is configured as partially amplitude-modifying elements.

12. The double confocal scanning microscope as defined in claim 1, wherein the optical component is configured as an adaptive optical system comprising a deformable mirror.

13. The double confocal scanning microscope as defined in claim 1, wherein the optical component is embodied as a dichroic filter that is disposed in the illuminating beam path or the detection beam path.

* * * * *